Aug. 2, 1927.
R. H. KEATON
1,637,775
COMBINATION ADVERTISING FOLDER AND GAUGE
Filed Oct. 20, 1924
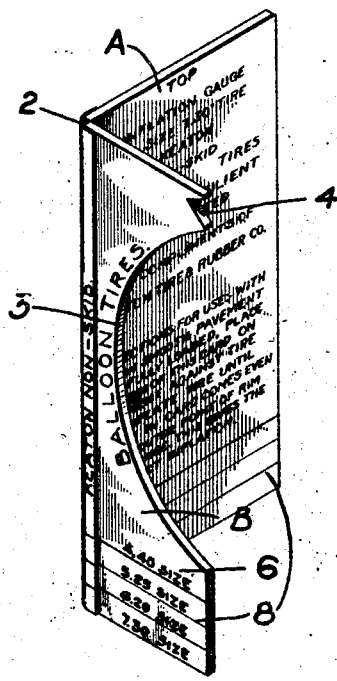
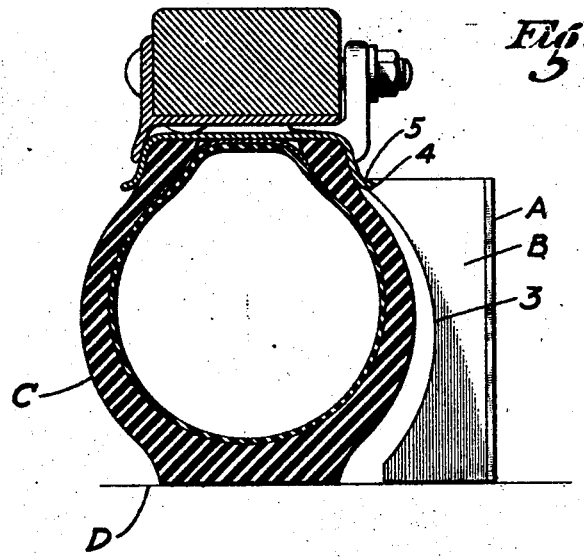
Inventor.
Robert H. Keaton.
By Dewey, Strong, Townsend & Loftus.
Attorneys.

Patented Aug. 2, 1927.

1,637,775

UNITED STATES PATENT OFFICE.

ROBERT H. KEATON, OF SAN FRANCISCO, CALIFORNIA.

COMBINATION ADVERTISING FOLDER AND GAUGE.

Application filed October 20, 1924. Serial No. 744,699.

This invention relates to a combination advertising folder and gauge.

The object of the present invention is to provide an advertising novelty which may be manufactured in the form of a folder to contain advertisements, etc., and directions for the care and use of balloon tires, and which will also serve the function of a gauge to determine the proper inflation of the tires; and further, to provide a device of this character which is small, compact and foldable so that it may be readily placed in the pocket of the user or in the side pocket of an automobile, etc.

One form which my invention may assume is exemplified in the following description and illustrated in the accompanying drawings, in which—

Fig. 1 is a perspective view of the combined advertising folder and gauge.

Fig. 2 is a cross section of a balloon tire and the rim carrying the same, said section showing the tire resting on the pavement or other supporting surface, and also showing the position of the gauge to determine proper inflation of the tire.

Since balloon tires have come into use considerable trouble has been encountered in determining the proper inflation of the tires. Proper inflation of ordinary tires has always been determined by testing the air pressure in the tires. For instance, one tire maker or manufacturer will recommend an air pressure of 75 pounds per square inch for certain sizes, and perhaps slightly more or less for other sizes, and all the user had to do was to see that the specified pressure was maintained by testing the air pressure from time to time. Such is not the case with the balloon tires. They are very flexible and carry comparatively low pressures, seldom in excess of 35 pounds per square inch. A maximum flexure of 22 degrees is usually allowed, but even with such a liberal allowance the tires are often abused due to improper inflation.

A certain sized balloon tire when placed on an automobile, for instance, one weighing approximately 3000 pounds, may require an air pressure of 28 pounds per square inch to obtain proper inflation, while the same tire placed on a heavier car may require an air pressure of 30 pounds per square inch, and so on. In other words a predetermined pressure can not always be employed as the proper inflation of the tire is determined by the weight of the car and by the inflated or expanded condition of the tire. A balloon tire must be expanded or inflated to a predetermined condition regardless of the weight of the car to obtain the best results, and as the air pressure increases with the weight of the car no predetermined pressure may be specified, but as the expanded condition of the tire is the determining factor, it can readily be seen that it is possible to determine the proper inflated condition by measuring the distance from the rim of the tire to the pavement upon which the tire is supported.

The present invention embodies a novelty which not only serves as an advertising medium, and so on, but which also serves another purpose, to-wit, that of a gauge to determine proper inflation of certain sized tires, this being accomplished by gauging or measuring the height or elevation of the tire rim with relation to the pavement or other surface upon which the tire may be supported.

The device comprises a folder consisting of two sections such as indicated at A and B. These sections may be constructed of paper or any other suitable material, and they may be hingedly connected in any suitable manner, as by a back section 2, such as employed in connection with books, folders, leaflets, etc.

The section A may contain advertisements and directions for the care and use of balloon tires, together with directions for properly employing the gauge. Section B may similarly have matter printed thereon in the form of advertisements, directions, etc., but its main function is that of a gauge. This is accomplished by cutting away a portion of the section B as indicated at 3 to permit it to straddle one side of the tire as shown in Fig. 2, and by forming a notch in the upper end as indicated at 4 which is adapted to align with the edge of the tire rim generally indicated at 5. The device is employed as follows:

With the tire indicated at C resting on the pavement or other suitable support such as indicated at D, it is only necessary to open the folder so that the section B assumes a position substantially at right angles to the section A. The device thus unfolded is self-supporting and will assume an erect position due to the right-angular base formed by the bottom of the folder section A and the foot extension 6 formed on the section B. The air hose or other device employed for inflating the tire is next placed on the valve and the air is admitted. The tire will gradually expand as the air pressure increases and when it reaches the stage of proper inflation, the edge of the rim 5 will register with the notch 4. Such registration will be obtained regardless of the weight of the car and the user will for this reason not rely upon predetermined or specified air pressures when inflating his tires, but will be solely guided by the visible measurement or indication given by the gauge.

The gauge may be used for tires of different sizes, so the base portion is lined or scored, as indicated at 8, and each line indicates a different size and is so marked. Hence, if 6.20 sized tire is used, the gauge is merely cut off along the line marked 6.20, and so on.

The device has proved exceedingly handy and convenient in actual practice and use, as it is so compact and small that it may readily be placed in the pocket of the user or in the side pocket of an automobile, or in any other convenient place where it may be readily reached when required. It not only serves the function of a useful novelty, but also serves the function of an advertising display medium; that is, it is self-supporting due to the base section or foot-support 6, which is provided, and as such may be placed in the windows for advertising purposes when desired, and while it may be constructed of any suitable material, such as paper or the like, it is obvious that metal may also be employed if desired.

Having thus described my invention, what I claim and desire to secure by Letters Patent is—

1. A device for determining the proper inflation of pneumatic tires, comprising a folder consisting of two hingedly connected sections, one section adapted to be swung to a position at right angles to the other section and having a member thereon to register with the rim of a tire when the lower edge of the folder rests upon a pavement upon which the tire rests when a tire is properly inflated.

2. A device for determining the proper inflation of pneumatic tires, comprising a folder consisting of two hingedly connected sections, one section having a V-shaped notch formed adjacent its upper end, said last-named section also having a foot extension formed thereon and said last-named section being adapted to be swung to a position at right angles to the other section so that the device may be placed along side a tire and may be maintained in an erect position, said device, when so positioned, determining the proper state of inflation by the notch registering with the rim of a tire.

3. A device for determining the proper inflation of pneumatic tires, comprising a folder consisting of two hingedly connected sections, one section adapted to be swung to a position at right angles to the other section and having a member thereon to register with the rim of a tire when the lower edge of the folder rests upon a pavement upon which the tire rests when a tire is properly inflated. there being indicia showing a plurality of sections on the lower end of said foldable sections that may be removed to reduce the height of the indicating member substantially as described.

ROBERT H. KEATON.